(12) United States Patent
Templeton

(10) Patent No.: US 10,338,624 B2
(45) Date of Patent: Jul. 2, 2019

(54) SYSTEM AND METHOD FOR MONITORING AND REDUCING ENERGY USAGE IN THE HOME

(71) Applicant: Alexander Templeton, Backus, MN (US)

(72) Inventor: Alexander Templeton, Backus, MN (US)

( * ) Notice: Subject to any disclaimer, the term of this patent is extended or adjusted under 35 U.S.C. 154(b) by 243 days.

(21) Appl. No.: 15/184,632

(22) Filed: Jun. 16, 2016

(65) Prior Publication Data

US 2017/0364112 A1    Dec. 21, 2017

(51) Int. Cl.
*G05F 1/66* (2006.01)
*H04L 12/28* (2006.01)

(52) U.S. Cl.
CPC ............ *G05F 1/66* (2013.01); *H04L 12/2825* (2013.01); *H04L 2012/285* (2013.01)

(58) Field of Classification Search
CPC ............................... G05F 1/66; H04L 12/2816
USPC ......................................................... 700/291
See application file for complete search history.

(56) References Cited

U.S. PATENT DOCUMENTS

| | | |
|---|---|---|
| 6,029,092 A | 2/2000 | Stein |
| 6,108,614 A | 8/2000 | Lincoln et al. |
| 6,263,260 B1 | 7/2001 | Bodmer et al. |
| 6,792,319 B1 | 9/2004 | Bilger |
| 6,912,429 B1 | 6/2005 | Bilger |
| 8,073,707 B2 | 12/2011 | Teller et al. |
| 8,095,340 B2 | 1/2012 | Brown |
| 8,977,731 B2 | 3/2015 | Venkatakrishman et al. |
| 2006/0161270 A1 | 7/2006 | Luskin et al. |
| 2006/0271214 A1* | 11/2006 | Brown ................. A61B 5/0002 700/90 |
| 2007/0246553 A1* | 10/2007 | Morrow ............. G05D 23/1905 236/46 R |
| 2009/0062970 A1 | 3/2009 | Forbes, Jr. et al. |
| 2009/0099814 A1* | 4/2009 | Scott ........................ F24F 11/30 702/178 |
| 2010/0076615 A1 | 3/2010 | Daniel et al. |
| 2010/0256828 A1* | 10/2010 | Wang ..................... G06Q 50/06 700/286 |
| 2010/0318235 A1 | 12/2010 | Moss |
| 2011/0015797 A1 | 6/2011 | Gilstrap |
| 2011/0153101 A1 | 6/2011 | Thomas et al. |

(Continued)

*Primary Examiner* — Robert E Fennema
*Assistant Examiner* — Jigneshkumar C Patel
(74) *Attorney, Agent, or Firm* — Dale J. Ream

(57) ABSTRACT

A system for reporting energy use in a home having an energy consuming device includes an energy sensor device in communication with the energy consuming device and configured to collect energy use data indicative of an energy consumption event. The collected energy use data includes real time data associated with the collected energy use data, including a start time and an end time. An application running on a local computing device receives the collected energy use data. A remote computing device is in electronic communication with the application so as to receive the collected energy use data from the application. Specific programming causes the remote computing device to consider energy use data, real time data, and associated weather data to derive a baseline energy use profile, a proposed reduction in energy usage, tracks savings and makes recommendations, said derivations being displayed by the software application on a local computing device.

26 Claims, 10 Drawing Sheets

(56) References Cited

U.S. PATENT DOCUMENTS

| | | | |
|---|---|---|---|
| 2011/0202189 A1 | 8/2011 | Venkatakrishnan et al. | |
| 2012/0053739 A1* | 3/2012 | Brian .................... | G06F 1/3203 700/287 |
| 2012/0053740 A1 | 3/2012 | Venkatakrishman et al. | |
| 2013/0110413 A1* | 5/2013 | Schork .................... | G01K 13/02 702/24 |
| 2013/0297087 A1 | 11/2013 | Koster et al. | |
| 2014/0147114 A1* | 5/2014 | Diab .................... | H04L 41/0833 398/38 |
| 2015/0061387 A1 | 3/2015 | Daniel et al. | |

* cited by examiner

| Name | Client |
|---|---|
| ZIP Code | 00000 |
| Email | Client@email.com |
| What size is your home in square feet? | 2400 sq. ft. |
| Which energy source is used to heat your home (gas, oil, propane, electric? | Propane |
| What size of furnace do you run in BTU? | 24,000 BTU |
| Do you use an AC system?   YES or No | Yes |
| Size of AC Unit in Tons? | 2 tons |
| Do you run a dishwasher? - - Yes or No | Yes |
| What style of refrigerator do you own?  Side-by Side, French Doors, etc. | Side-by-Side |
| What size is your refrigerator in cubic feet? | 23 cubic feet |
| Do you have a freezer? If so, chest or upright | Chest |
| What size is your freezer in cubic feet? | 12 cubic feet |
| Do you have a washing machine? | Yes |
| Do you have a clothes dryer?  If so, gas or electric? | Electric |
| How much do you agree with the following statement? | |
| I believe I can save energy in my home | Strongly Agree |

Fig. 7

Home Energy Statistics & Suggestions

Your avg. Savings   7.9%
Your City Avg.      8.9%
Your Rank           18237 of 2.2M Users
National Ratings    Woohoo! Top 9%

Cumulative State       3.9%
Cumulative National    1.9%

Insulation Profile
Susceptible to :
NW and NE winds:    Suggest Draught Proofing
Sunny days :        Insulate W & S Basement
                    Walls & Loft Fixed temp.         Suggest Prog Thermostat

SYSTEM AND METHOD FOR MONITORING AND REDUCING ENERGY USAGE IN THE HOME

BACKGROUND OF THE INVENTION

The present invention relates to a system for monitoring and reducing energy use in buildings and, more particularly, to a system for collecting data relating to an individual's energy use habits, home appliance efficiency, insulation levels and fuel types used and storing collected data at a remote site preferably over an electronic network. The system includes deriving cost analysis and analytical information based on such data available to the individual.

Research has shown that more than 20% of the energy used in the United States could be saved by simple means using existing technologies if consumers were more aware of how they could contribute. The lack of knowledge is caused in whole or in part by a lack of awareness by the general public about how this waste occurs. More and more, our society requires people to lead fast-paced, achievement-oriented lifestyles that often result in little to no attention being paid to how energy is used in the home. However, many not only recognize the correlation between reduced energy use and their pocket books, but accept the positive effects on climate change that ensue when less fossil fuels are burned. As a result, a growing number of Americans would likely reduce their energy consumption if a system existed to help identify where most energy is used in the home and show how small, individual reductions in energy consumption can aggregate to significant reductions if these same actions are taken by the community as a whole. People are interested in establishing responsible energy consumption lifestyles, they simply need education and encouragement to create and maintain them.

Several systems exist that provide measurements of energy used by individual electric appliances or the house as a whole, but these systems must be plugged in to the energy consuming devices in question in order for readings to be taken. The expensive nature of these products tends to limit use to highly motivated individuals. Moreover, these people tend to be familiar with the language used in the art and can appreciate the significance of kWh, BTU, Therms, and Joules in the readings provided by these products. Conversely there are no products available to address the needs of the general population interested in achieving a lower energy lifestyle. Uniquely, the present invention allows individuals to monitor and reduce their consumption of energy from all common sources such as electric, natural gas, propane gas and heating oil.

There have been several attempts to meet the needs of these individuals, including a profusion of energy reduction programs, monitoring equipment, and a plethora of self help web sites on the Internet. Each of these attempts is targeted to empower the individual to take charge and reduce energy consumption. Further, US Patent Publication 2010/0318235 to Moss discloses a wireless sensing device in communication with an appliance to determine when it is on or off and measuring one of humidity, temperature, or ambient light and communicating the appliance usage data to a data collection gateway. Moss, however, is unnecessarily complicated and inefficient in measuring and collecting actual energy usage data in order to affect human behavior to reduce energy usage. Such actual quantitative measurements are unexpectedly unnecessary in the present application.

In addition, the system proposed by Moss requires multiple sensors to measure energy or every energy consumption event which will require a significantly undesirable amount of battery power and time. The Moss system is an event trigger and stores no data to allow thermal step response determination. By contrast, the present system requires only a sampled data collection that allows energy use analysis.

Although presumably effective for their intended purposes, each of these proposals addresses only part of the needs of individuals seeking a lower energy lifestyle and ignores many of the real barriers that most individuals face when trying to adopt such a lifestyle. These barriers include the fact that the individual is often left to himself or herself to find motivation, to implement a plan for achieving a lower energy lifestyle, to monitor progress, and to brainstorm solutions when problems arise; the fact that existing programs are directed to only certain aspects of change to a lower energy lifestyle, and rarely come as a complete package; and the fact that recommendations are most often made in the language of Power Engineers, not in a language readily understood by the individual.

Therefore, it would be desirable to have a system and method for detecting, monitoring and reporting energy use in the home. Further, it would be desirable to have a system that establishes a baseline of current energy use, proposes a reduction plan, and monitors progress toward meeting the proposed goals, and which provides advice, based on energy usage data, weather, and building thermal step response—all correlated with real time clock data—on home improvements and materials to improve the home's energy use profile.

SUMMARY OF THE INVENTION

A system is disclosed for detecting, monitoring and reporting energy use in the home. The system includes a sensor device which generates data indicative of one or more energy consumption parameters and derived data from at least a portion of the data indicative of one or more energy consumption parameters when placed in a room in a home or in contact with an energy consuming device. The system also includes a remote computing device, e.g. a cloud computing server) located remote from the sensor device. The remote computing device generates analytical status data from at least one of the data indicative of one or more energy consumption parameters, the derived data, and analytical status data that has previously been generated. The remote computing device also includes a data storage device for retrievably storing the data it receives and generates.

The disclosed system also includes means for establishing electronic communication between the sensor device and the remote computing device. Examples may include various known types of long range wireless transmission devices, or a physical or a short range wireless coupling to a computer which in turn establishes electronic communication with the remote computing device over an electronic network such as the Internet. Also included in the system is a means for transmitting the data indicative of one or more energy consumption parameters, the derived data, and/or the analytical status data to a recipient, such as the individual or a third party authorized by the individual.

Also disclosed is a method of detecting, monitoring and reporting energy consumption information. The method includes generating at least one of data indicative of one or more energy consumption parameters of the individual's home and derived data from at least a portion of the data indicative of one or more energy consumption parameters using a sensor device adapted to be a proxy for active power use. The data indicative of one or more energy consumption parameters and the derived data are transmitted to a remote computing device remote from said sensor device and retrievably stored in a storage device. Analytical status data is generated from at least a portion of at least one of the data indicative of one or more energy consumption parameters, the derived data and the analytical status data, and at least one of the data indicative of one or more energy consumption parameters, the derived data and the analytical status data is transmitted to a recipient.

The remote computing device may be configured to populate one or more web pages containing the data indicative of one or more energy consumption parameters, the derived data, and/or the analytical status data. The web pages generated by the remote computing device are accessible by the recipient or a third party authorized by the recipient over an electronic network, such as the Internet. Alternatively, the data indicative of one or more energy consumption parameters, the derived data, and/or the analytical status data may be transmitted to the recipient's smart phone or in a physical form such as mail or facsimile.

Also disclosed is a method of monitoring the degree to which an individual has followed a suggested energy saving routine. Also received at the remote computing device is energy profile data of the individual, including the age of key equipment. The method further includes generating at the remote computing device feedback relating to the degree to which the individual has followed the suggested routine, the feedback being generated from at least a portion of at least one of the data indicative of one or more energy consumption parameters of the individual, the derived data, and the energy profile data, and providing the feedback to a recipient.

Now, with more particularity on the technical details of the system, a system for detecting, monitoring, and reporting energy use in a home having an energy consuming device or the purpose of reducing energy usage includes an energy sensor device in data communication with the energy consuming device and configured to detect and collect energy use data indicative of an energy consumption event, the energy sensor device having a processor and a non-volatile memory configured to store the collected energy use data. The collected energy use data includes real time data associated with the collected energy use data, the real time data including a start time and an end time. A software application running on a local computing device is in data communication with the energy sensor device and configured to receive the collected energy use data via Bluetooth low energy protocols.

A remote computing device is located remote from and in electronic communication with the application so as to receive the collected energy use data from the application, the remote computing device including a remote processor and a non-volatile memory having data structures and programming. Specific programming causes the remote processor to derive an energy use profile based on the received collected energy use data and the associated real time data and to deliver the derived energy use profile to the application. The application is configured to actuate an output member of the local computing device to display the derived energy use profile.

Therefore, a general object of this invention is to provide a system and method for detecting, monitoring and reporting energy use in the home that results in a reduction of energy use.

Another object of this invention is to provide a system, as aforesaid, that establishes a baseline of current energy use via a primary sensor in communication with an energy consuming device in the home, proposes an energy reduction plan, and monitors progress toward meeting the proposed goals and which provides advice, based on energy usage data, weather, and thermal step response, on home improvements and materials to improve the home's energy use profile.

Still another object of this invention is to provide a system, as aforesaid, that provides advice, based on energy usage data, weather, and thermal step response, on home improvements and materials to improve the home's energy use profile.

Yet another object of this invention is to provide a system, as aforesaid, that is scalable for use by a community of users interested in energy reduction and such that comparisons and aggregation of energy use and reduction data may be determined and displayed.

A further object of this invention is to provide a system, as aforesaid, that correlates energy savings to credits or incentive for a user to purchase recommended goods from a supplier of energy reducing products.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 7 is an exemplary input table that is used in the registration process of FIG. 6;

DESCRIPTION OF THE PREFERRED EMBODIMENT

Figure 1:
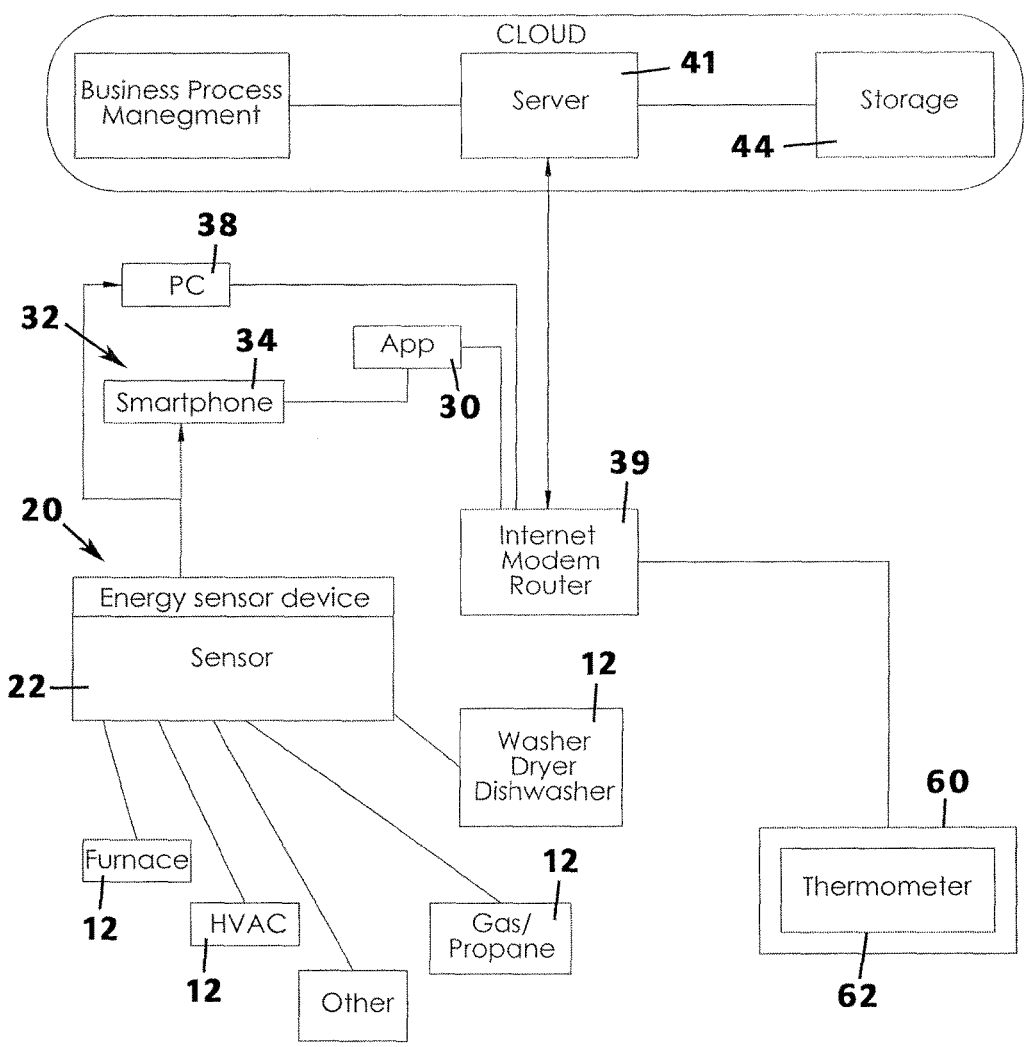
FIG. 1 is a block diagram of a system for detecting, monitoring, and reporting residential energy use according to a preferred embodiment of the present invention.
Figure 2:
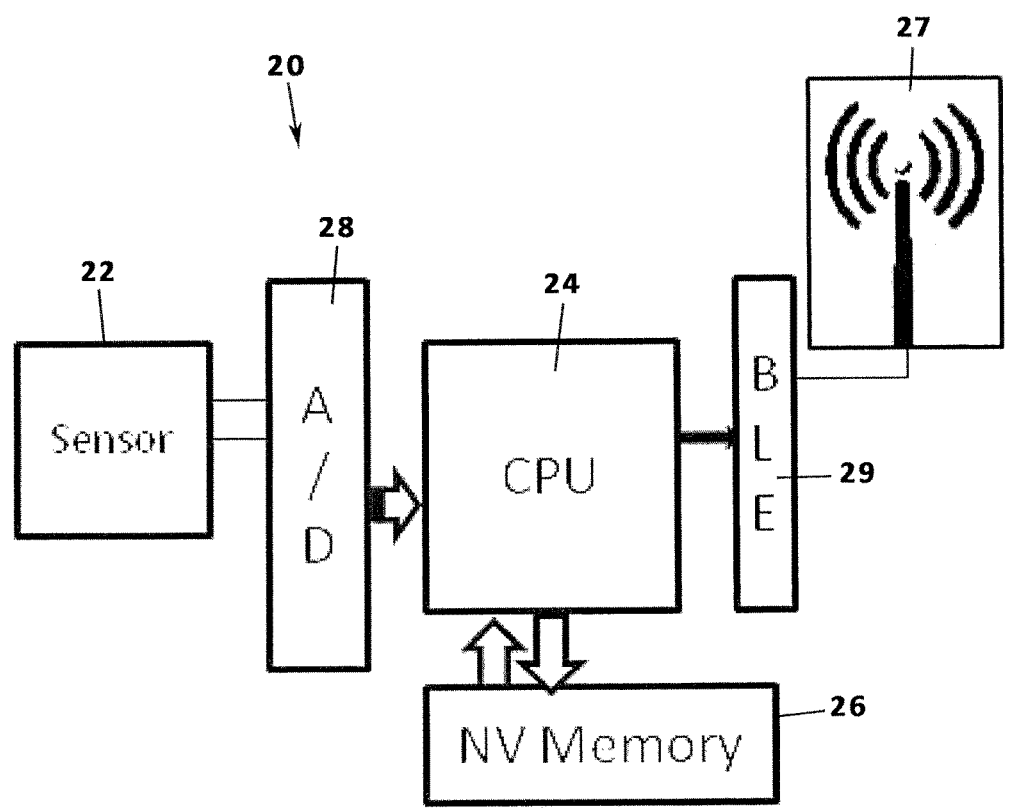
FIG. 2 is a block diagram of an energy use sensor according to the system illustrated in FIG. 1.

A system and method for detecting, monitoring, and reporting residential energy use for the purpose of reducing energy usage will now be described with reference to FIGS. 1 to 10 of the accompanying drawings. The system 10 includes an energy sensor device 20, a software application 30 running on a local computing device 32, and a remote computing device 40 having programming to calculate a baseline energy use profile and other derived data based on the collected energy use data regarding energy used by an energy consuming device 12 in a residential environment for the purpose of motivating a reduction in energy usage by users of the system 10.

Figure 3:
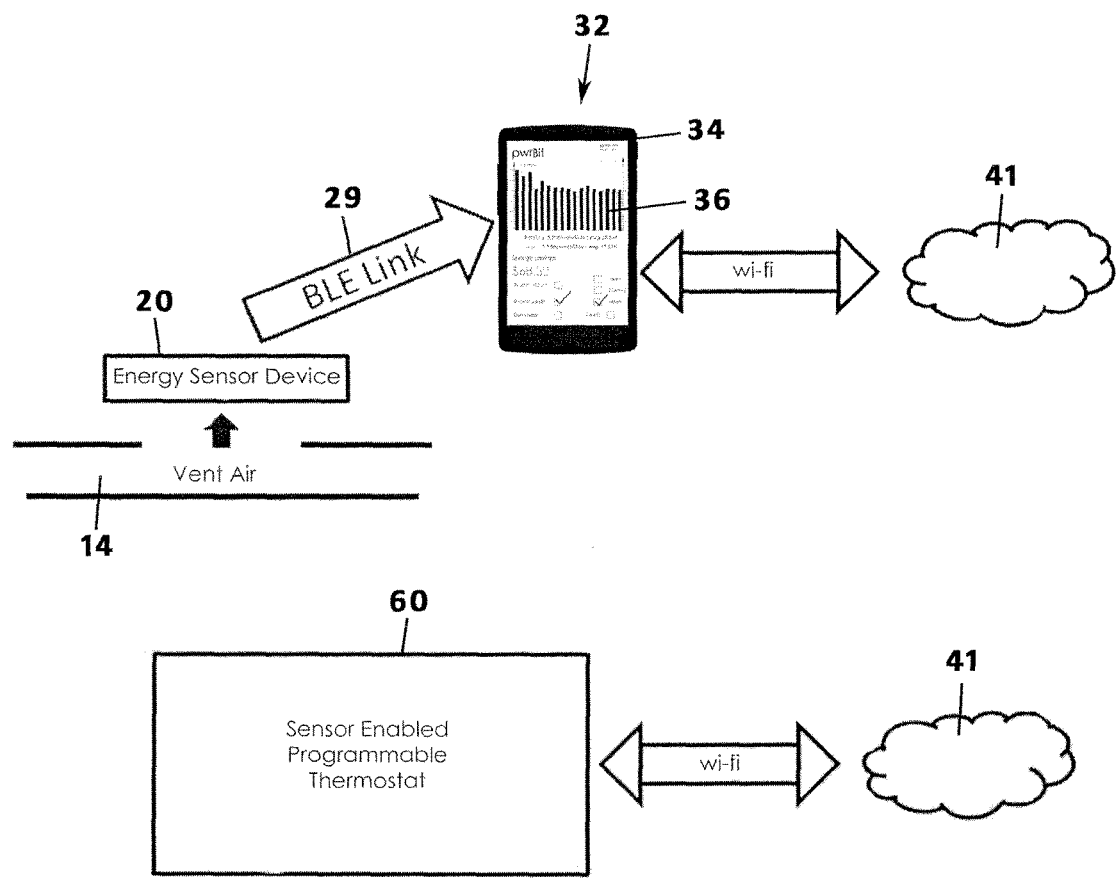
FIG. 3 is a schematic illustration of signal communications between an energy use sensor and computing devices.

In an embodiment, an energy sensor device 20 may be placed in operative contact or proximity with an energy consuming device 12 in a residential or home environment. By way of example but not of limitation, an exemplary energy consuming device 12 is a HVAC system (e.g. a heating and cooling system). In this example, the energy sensor device 20 may include or be in operative communication with temperature sensor 22 that may be placed atop a vent 14 at the end of an air duct extending from an air condition or heating unit in a home or building (FIG. 3). The temperature sensor 22 is configured to detect when hot or cold air is flowing from the vent that is indicative the AC/heating unit is running The energy sensor device 20 may include other sensors as well, such as an accelerometer, a vibration sensor, a magnetic field sensor (such as a giant megnetoresistance sensor ("GMR sensor"), and a voltage sensor. Each of these sensors is particularly suitable for use with other energy consuming devices, such as a water heater, electrical or gas utility device, dishwasher, or the like. In an embodiment, a plurality of additional energy sensor devices 20 may be used within the residence so that multiple energy consuming devices may provide collected data for analysis, as will be described in more detail later. The "additional" energy sensor devices 20 also references that multiple residences may be included in the present system—each having one or more energy sensor devices 20. Note that the reference to a single energy sensor device 20 and "additional" energy sensor devices 20 are intentionally referenced by the same reference numeral as they refer to the same component.

The energy sensor device 20 may also include a sensor device processor 24, a non-volatile memory 26, an analog to digital signal converter 28, and a Bluetooth low energy signal interface 29 ("BLE") that connects to a personal area network via Radio Frequency antenna 27. The sensor device processor 24 is configured or programmed to determine, in real time, a start time (also called an "on time") at which the energy consuming device 12 (such as a HVAC) becomes activated and an end time (also called an "off time") at which the energy consuming device is deactivated. This on/off time data, taken in real time, may be included (such as being coded in a bit pattern) in the collected energy use data obtained by the sensor device processor 24. The collected energy use data may also be viewed and referred to as usage data or "time of use" of energy use data. The collected energy use data, including the real time data associated therewith, may be stored in the energy sensor device memory 26, e.g. in respective data structures.

The collected data may also include data indicative of an amount of time between an "off time" (i.e. in which the energy consuming device is deactivated) and a next successive "on time" (i.e. the next time the energy consuming device is activated or energized). This time between activations of the energy consuming device may be used in determining thermal step response data, by itself or in conjunction with collected energy use data, weather data, real time data, or some other considerations, as will be described in greater detail later.

It is understood that, when positioned in contact or proximity with an energy consuming device 12 (such as a furnace or complete HVAC system) and initially activated, the energy sensor device 20 may "calibrate" itself to the energy environment. In other words, the energy sensor device 20 may collect energy usage (on/off) data for a predetermined period—such as three days—before first delivering this data to the application 30 and remote computing device 40 which will derive a baseline energy use profile for the residential environment as will be described more fully below.

The system 10 may include a software application 30 configured to run on a local computing device 32. Preferably, the local computing device 32 is a mobile phone 34 (preferably a smart phone) although the application 30 (i.e. a computer software program) may also be configured to run on a personal computer 38, a personal digital assistant, an electronic tablet, or other electronic device configured to wirelessly receive low energy signals (such as a Bluetooth low energy ("BLE") enabled device). The application 30, running on a BLE enabled local computing device 32 is configured to receive the collected energy use data from the energy sensor device 20, such as in respective memory locations. It is understood that the local computing device 32 may also include an input member (e.g. a touch screen alphanumeric keyboard or keypad) and an output member 36 (e.g. a display) as will be described later in more detail.

It is understood that at least one of the energy sensor device 20 or the software application 30 in communication with a local computing device 32 includes a real time clock electronic component that is configured to determine actual clock time data and to correlate actual time data with associated on/off data relative to the respective energy consuming device. The real time clock data may be seen as a time stamp.

The system 10 includes a remote computing device 40 located remote from the local computing device 32 and the energy sensor device 20. More particularly, the remote computing device 40 may be a cloud server 41 in data communication with the application 30 and local computing device 32 via a wide area network such as the internet. It is understood that the local computing device 32 (e.g. mobile phone) may be in data communication with a local network (wired or wireless) at a residential location which may then be connected to the internet for data communication with the remote computing device 40. Specifically, the connection to the internet may be via an internet modem router 35. Connection thereto may require user registration, password access protection, or other procedures regulating access thereto.

The remote computing device 40 is configured to receive the collected energy use data 46 and other data from the local computing device 32 via the internet. More particularly, the remote computing device 40 may include a remote processor 42 and a non-volatile memory 44 (also referred to in the drawings as "storage" or cloud storage) having data structures for storing data and programming instructions 45 configured to cause the remote processor 42 to take actions as will be described below.

Figure 4:
FIG. 4 is a front view of a software application according to the present invention running on a smart phone.
Figure 5:
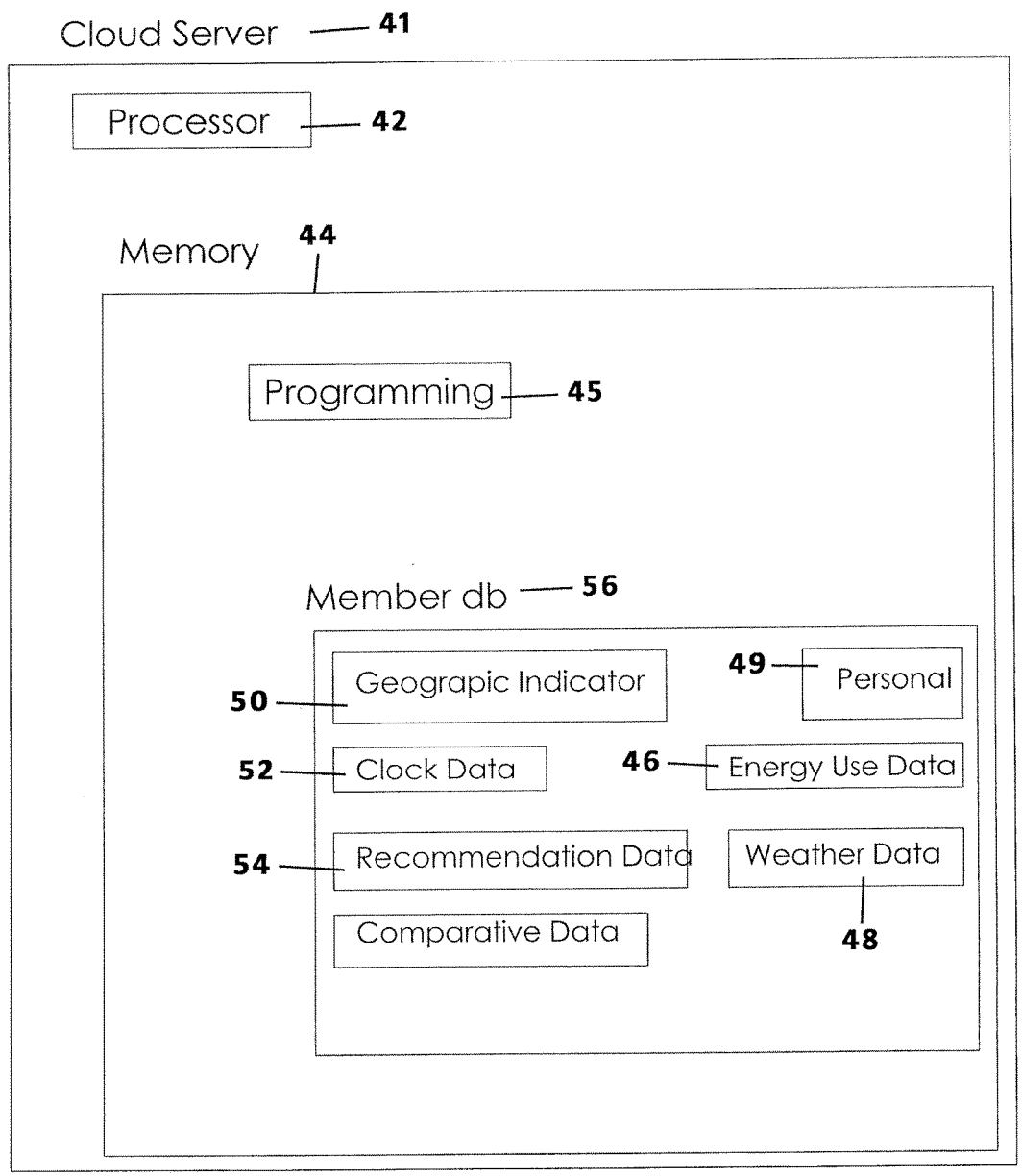
FIG. 5 is a block diagram illustrating the electronic architecture of a remote computing device according to the present invention.

The programming, when executed by the remote processor 42, causes the remote processor 42 to derive a baseline energy use profile based on the received collected energy use data including the associated real time clock data 52. Specifically, the remote processor 42 may use the initial calibration data collected by the energy sensor device 20 for this purpose as described above. The baseline energy use profile may be represented in the form of a bar graph (or other graphical representation) showing energy usage over a predetermined period of time, e.g. days, weeks, or months (FIG. 4). Programming also causes the remote processor 42 to transmit or otherwise deliver the derived baseline energy use profile back to the application 30 running on the local computing device 32. The application 30 is configured to actuate the output member 36 of the local computing device 32 to display the derived baseline energy use profile so that a respective user may view the information graphically.

When sufficient additional collected energy use data 46 is collected, transmitted to, and received by the remote computing device 40, a proposed reduction in the baseline energy use profile is derived by the remote processor 42 via respective programming. For instance, the remote processor 42 may be programmed to propose a 10% reduction in energy use across the days of energy usage collected and generate a graphical representation of this goal (FIG. 4). The proposed energy plan may be transmitted back to the application 30 for display upon the output member 36 of the local computing device 32 for review by the residential customer.

In another aspect, a geographical indicator 50 (such as a zipcode or global position satellite ("GPS") coordinate) is generated and associated with the user or home being monitored and energy use data 46 that is being collected. More particularly, the energy sensor device 20 or the software application 30 that is receiving the collected data may be configured and programmed to generate the zipcode or GPS indicator 50 and to associate and store it with the collected energy use data. Then, the geographically tagged collected data is transmitted to the remote computing device 40 for storage and for analysis as described above. Knowing the geographical location of the home where the data is being collected is important in that the data will be correlated with local weather that occurred in real time when the energy use data was collected as will be described below.

The remote computing device 40 may include programming causing the remote processor 42 to access an online weather service to obtain weather data 48 specifically associated with the geographical indicator and according to the real time clock data associated with when it was collected. More particularly, a software application (i.e. an application protocol interface ("API")) may be running on the remote computing device 40 and configured to access the online weather service. Then the remote processor 42, according to programming, correlates the weather data 48, real time clock data 52, and geographic indicator 50 in order to derive meaningful energy use data for the home.

With further regard to the remote computing device 40, predetermined recommendation data 54 may be stored in the remote computing device's memory 44. The recommendation data 54 may include predetermined "advice" to a user about strategies and methods of reducing energy usage, specific materials and products that may be purchased or used to reduce a home's energy use, and even specific parts of a house that are likely to need improvement based on processing of energy use data, real time correlated weather data, and the geographic indicator. In other words, the remote computing device 40 may include a so-called "expert system" capable of drawing conclusions and making recommendations based on all the data available to it as described above. Once the recommendation data 54 is determined by the remote processor 42 (in some cases solicited by a user and, in other cases, offered proactively), the remote processor 42 may direct the recommendation data be delivered electronically to the application 30 running on a mobile phone, where it may be displayed on an output member 36 thereof (i.e. on its electronic display) or delivered to another device, website, or printer.

Figure 8:
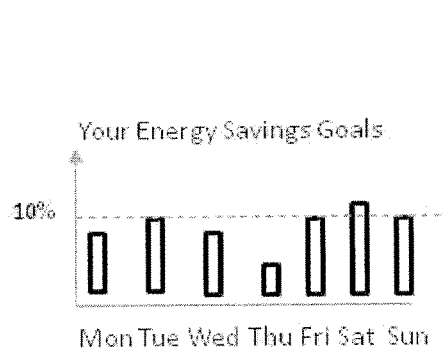
FIG. 8 is an example of output that may be displayed by a local computing device indicative of calculations and recommendations received from the remote computing device.

For example, the remote processor 42, under program control, may conclude that a heater system has been running excessively due to strong north winds likely to be penetrating an under-insulated north wall of the residence matching the geographic indicator 50. As such, the remote computing device 40 may determine "recommendation data" to be returned to the application running on the local computing device 32 that is specific to a need for taking recommended actions or, in some embodiments, recommending particular insulation products. This recommendation data may be published (i.e. displayed) by the software application 30 via the output member 36 of the device, i.e. on a display of a mobile phone (FIG. 8).

Figure 9:
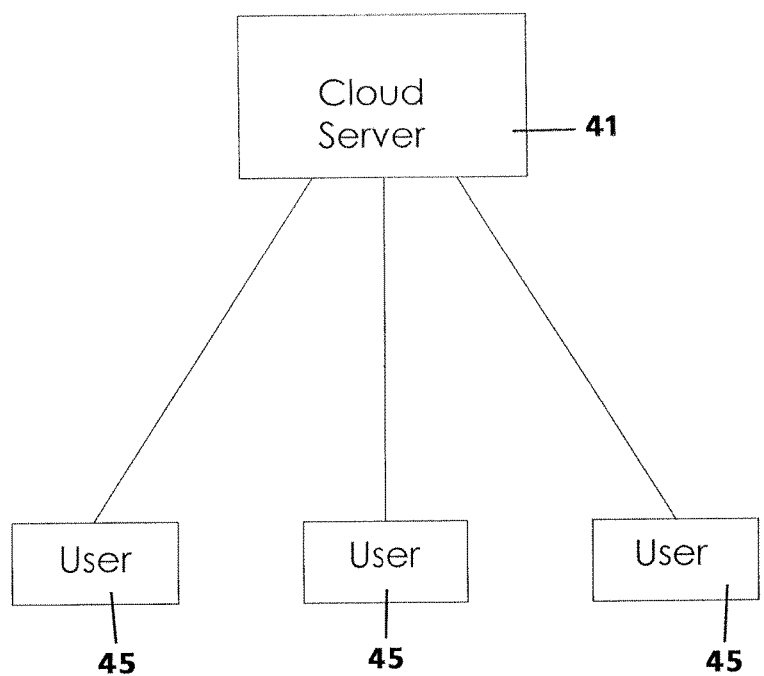
FIG. 9 is a block diagram illustrating the system of FIG. 1 in use with multiple users simultaneously via respective internet connections.

The present system 10 is intended for the use and benefit of an entire community of users, such as residential home owners, who desire to improve their own energy use habits and cost savings as well as a reduction of energy usage on a local, state, and national scale. Accordingly, the data structures of the memory 44 of the remote computing device 40 are scalable to accommodate multiple users. For instance, FIG. 9 represents the remote computing device 40 in data communication with a plurality of users 45 or user residential locations. Specifically, the memory 44 may include a user database 56 having a plurality of user records, each user record including, but not limited to, a user's personal identification data 49, a respective geographical indicator associated with the residential location, and energy use data 46 associated with the user's home.

Figure 6:
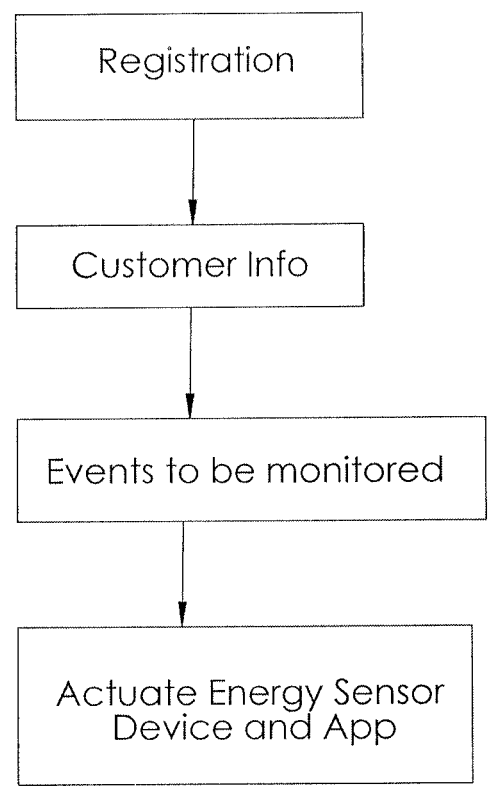
FIG. 6 is a flowchart illustration a user registration process.

The programming may include an initial user registration process that includes soliciting the data needed to populate the user records (FIG. 7). This initial data may alternatively be gathered by the software application 30 running on the local computing device 32 or even via a website page. In that case, the application 30 is configured to actuate an input member of the local computing device 32 to receive entered data, e.g. a keyboard or keypad of a cell phone, and then to deliver this data to the remote computing device 40 via the internet. Initial information gathering may include providing information on various energy consuming devices 12 in the home, square footage of the home, construction materials being used, and the like. An exemplary process of gathering initial information from a registering user is shown in FIGS. 6 and 7.

Further, the present system 10 includes a plurality of additional energy sensor devices 20—one or more for each user location registered in the remote computing device 40 records. It is understood that the energy sensor devices 20 may be sold inexpensively or even given away to promote user participation in the overall program that envelops the present system 10. The additional energy sensor devices referenced in this paragraph are identical in construction and function as first described in this application above and are identified with the same reference numeral. The remote computing device 40 is configured to receive respective collected energy use data from a plurality of software applications corresponding to multiple users and associated energy sensor devices 20 representing an entire community of users of the system (FIG. 9).

As energy usage data continues to be collected by a respective energy sensor device 20 and delivered to the remote computing device 40 and associated with a respective user, the remote processor 42 is able to derive an amount of energy savings that is being experienced. As described above, a baseline energy use profile was generated, a proposed reduction recommendation was made, and advice or material recommendations were made—in an effort to motivate the user to reduce energy usage in the home. As further energy usage data is recorded, comparisons to the baseline energy use profile can be made by the remote processor 42 to determine quantitatively a degree of energy use reduction over selected periods of time, e.g. a week, month, or year. In an embodiment, this savings data may be used in calculating a monetary estimate of savings. This savings data may be returned to the application 30 running on a local computing device 32 and displayed thereon in a manner as described above (FIG. 4).

In addition to the remote computing device 40 continuing to collect energy use data so as to calculate a reduction or savings, specific programming causes the remote processor 42 to monitor compliance with energy reduction advice or strategic plans. In other words, if the remote processor 42 determines that actual usage data is not sufficiently meeting or approaching the energy use reduction goals (as discussed above), the remote processor 42 is programmed to take actions, such as alerting a user regarding the lack of compliance.

Related to calculating a particular user's energy usage reductions and the correlated savings is being able to calculate energy savings across the whole user community. In other words, the energy savings of all users may be aggregated so as to determine a total amount of energy use savings. The application 30 is configured to display individual savings or community savings via the output member 36 (FIG. 8). Aggregated usage data reductions may also be correlated to energy demand mapping resources in order to visualize and understand how overall energy demand may be decreasing. Specifically, a link from the remote computing device 40 to that of online utility power company demand mapping systems will enable correlated aggregate savings and behavioral demand reduction paradigms.

In another aspect, the remote processor 42 is configured to execute programming that selectively causes one or more internet websites or web pages to be generated for each respective user (i.e. for each registered community energy reduction member). Preferably, each website may be configured to display the respective baseline energy use profile, energy reduction recommendations, energy use savings, material or product recommendations, and system advice. It is understood that the user websites may be accessible to authorized users via the internet or via the local computing device 32, i.e. smart phone.

It is understood that the system 10 is configured for interactive communications between the application 30 and local computing device 32 and the remote computing device 40 (i.e. the cloud server). As described above, the remote computing device 40 is configured to receive a query from a user via internet access, an authorized user is able to access data stored in the memory 44 of the remote computing device 40, to generate graphic arts displays representing energy use data and the like, and to deliver data back to the local computing device 32 for display on an output member 36 (i.e. a digital display).

Another derivation of useful data that may be generated by coordination of an energy sensor device 20 and the remote computing device 40 is referred to as "thermal step response" data. As discussed previously, energy use data collected by an energy sensor device 20 includes a start time (an "on time") according to a real time clock and a stop time (an "off time") that are then delivered first to an application running on a local computing device via BLE and then on to a remote computing device 40 via an internet connection. Now, in a thermal step response mode, the collected energy use data may include a variable thermal step response time that represents the time from the end of a respective "on period" (the Step) to the start of the next on period. For example, a thermal step response time is a calculation of how much time has the HVAC system remained "off" between cycles. Stated another way, the thermal step response time measures how well the home is holding its temperature before the heating or cooling system must come on to restore a desired temperature. Most importantly, variation in Thermal Step Response is indicative of susceptibility of the home to external weather factors such as winds and incident sunshine.

Alternatively, this calculation may be accomplished by the remote processor 42 analyzing received energy usage data from the energy sensor device 20. For instance, programming executed by the remote processor 42 over a selected period of time can correlate thermal step response data with regard to time and associated local weather data to draw conclusions about how variation in thermal step response times may be reduced, such as by improvements to the residence and even to particular walls of the residence. For instance, if high variation in thermal step response (e.g. high statistical standard deviation of recorded "off times") is experienced at a time when respective weather data shows that strong north winds and cold temperatures were experienced the remote computing device 40 is able to generate specific recommendations to further insulate the north wall of the house. This "targeted advice data" may be delivered to the associated local computing device 32 and application 30 for display. Alternatively or in addition, this recommendation may be posted to the associated user's webpage.

In yet another aspect, an energy sensor device 20 may include enhanced structure and function so as to operate in a manner similar to a programmable thermostat 60. This enhanced device may be referred to as an energy sensor device enabled programmable thermostat. More particularly, the energy sensor device 20 may include a thermometer configured to detect a temperature of ambient air. The energy sensor device 20 is in data communication with the thermometer 62 and configured to actuate the energy consuming device 12 (e.g. HVAC system) when the thermometer 62 is indicative of a temperature lower/greater than a predetermined or manually set temperature.

The sensor device processor 24 is configured to determine a start time at which the energy consuming device 12 was activated and a stop time at which the energy consuming device 12 was deactivated. The energy sensor device 20 includes a non-volatile memory 26 configured to store respective start/stop data which may then be used to calculate energy use data and related derivations when communicated to the remote computing device 40 as described above. The assembly described immediately above may be referred to as an energy sensor device enabled thermostat.

Figure 10:
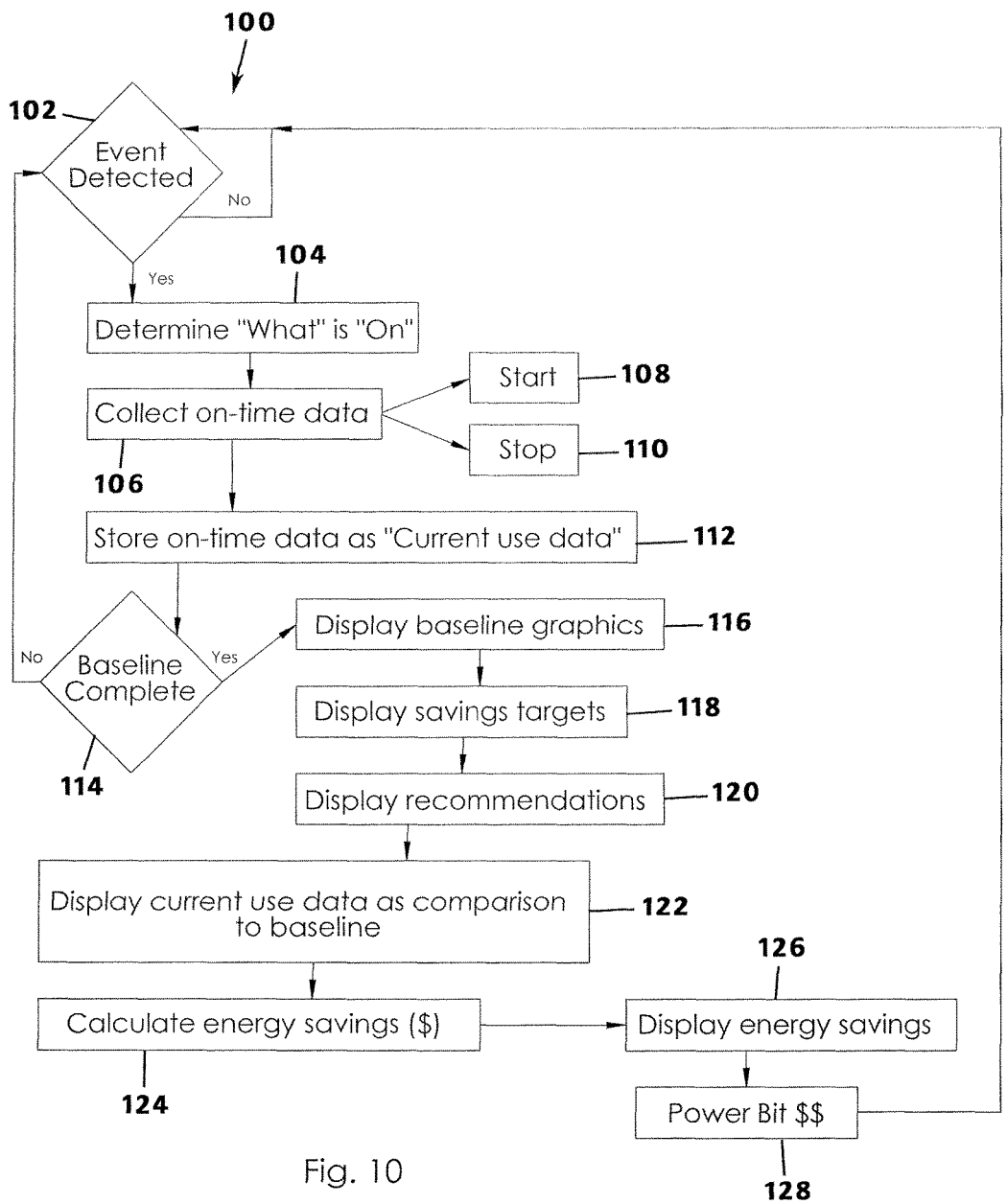
FIG. 10 is a flowchart illustrating an exemplary process according to the present system and method.

An exemplary process 100 of operation of the overall system 10 is illustrated in FIG. 10. It is understood, however, that many variations are possible as is evident from the detailed description above. This process 100 is carried out by communications between an energy use device 20, application 30 running on a local computing device 32, and the remote computing device 40 as described previously in detail. Process 100 begins at step 102 by determining if an energy use event is detected and, if detected, the process 100 proceeds to step 104; otherwise, the process 100 cycles to step 102 again. At steps 104 and 106, it is determined what energy consuming device 12 is "on" and then start time 108 and end time 110 data may be collected. The process 100 then proceeds to step 112.

At step 112, the collected energy use data is stored in memory, such as in a data structure identified as "current use data" or the like. This is the use data that is then delivered to the remote computing device (i.e. cloud server) and associated with a respective user record and geographic identifier. The process 100 then proceeds to step 114.

At step 114, the remote processor 42 determines if the baseline energy profile is complete and, if so, the process 100 proceeds to step 116; otherwise, the process 100 returns to step 102 where another energy consumption event may be detected as described above. At steps 116, 118, and 120, the baseline profile, savings targets, and recommendations are derived as described above and delivered for display under control of the software application 30 running on the local computing device 32. Process 100 then proceeds to step 122.

At step 122, current energy use data (from step 112) may be displayed upon the display of the local computing device 32 as a comparison with the baseline energy data. This may be done along with a message of accountability advising the resident of favorable performance regarding lowering energy usage or of unfavorable performance regarding increasing energy usage. It is understood that displaying positive and negative use data is intended to influence a behavioral response of being motivated to decrease energy usage in the home. The process 100 continues to step 124.

At step 124, the remote processor 42 derives a quantitative value associated with the energy saved over a period of time as a comparison to the baseline energy profile. The energy savings value may be displayed on the output member 36 of the mobile phone 34 or similar local computing device 30, as shown at step 126. This savings value may be referred to as "pwrbit dollars" in a marketing embodiment shown in step 128 and perhaps be redeemable as credit toward purchasing recommended products at a sponsoring retail store. Then, the process 100 may return to step 102 and begin again.

It is understood that while certain forms of this invention have been illustrated and described, it is not limited thereto except insofar as such limitations are included in the following claims and allowable functional equivalents thereof.

The invention claimed is:

1. A system for detecting, monitoring, and reporting energy use in a home having an HVAC device, said system comprising:
   a thermal sensor device in communication with the HVAC device and operable to detect and collect run-time data indicative of an energy consumption event, said thermal sensor device having a processor and a non-volatile memory configured to store said collected run-time data;
   wherein said collected run-time data includes:
      real time data including a start time and an end time regarding said energy consumption event;
      only non-quantifiable data unrelated to electrical current or voltage or volume of natural gas or propane;
   wherein said thermal sensor device includes a run-time sensor and operable for detecting in real time when the HVAC switches on or off;
   an application running on a local computing device in data communication with said thermal sensor device and configured to receive said collected run-time data;
   a remote computing device located remote from and in electronic communication with said application so as to receive said collected run-time data from said application, said remote computing device including a remote processor and a non-volatile memory having data structures and programming;
   programming in said remote memory that, when executed by said remote processor, causes said remote processor to derive an energy use profile based on said received collected run-time data and said associated real time data and to deliver said derived energy use profile to said application;
   wherein said application is configured to actuate an output member of the local computing device to display said derived energy use profile;
   programming in said remote memory that, when executed by said remote processor, causes said remote processor to derive a proposed reduction of said energy use profile;
   wherein said application is configured to actuate an output member of the local computing device to display said derived proposed reduction of said energy use profile and to deliver said derived proposed reduction of said energy use profile to said application;
   wherein said application is operable to cause said HVAC device to start and stop according to said proposed reduction of said energy use profile;
   wherein:
      said collected energy use data includes variation data of thermal step response data indicative of a variation in time from an end of a respective "on period" and a next start time relative to activation of the energy consuming device;
      said programming causes said remote processor to determine targeted advice data from said recommendation data based on said variation data derived from said collected energy use data, said real time data, said thermal step response data.

2. The system as in claim 1, wherein:
one of said thermal sensor device and said application is configured to generate a geographical indicator associated with said collected energy use run-time data;
said programming causes said remote processor to access weather data associated with a respective geographical indicator and associated with respective real time data of said collected energy use run-time data.

3. The system as in claim 2, wherein:
said remote memory includes recommendation data indicative of materials and conditions related to energy savings;
said programming causes said remote processor to determine targeted advice data from said recommendation data based on said collected energy use run-time data, said real time data, and said associated weather data;
wherein said application is configured to actuate an output member of the local computing device to display said targeted advice data.

4. The system as in claim 1, wherein:
said programming causes said remote processor to derive a proposed reduction of said energy use profile and to deliver said derived proposed reduction to said application;
said application is configured to actuate the output member of the local computing device to display said derived proposed reduction.

5. The system as in claim 4, wherein:
said thermal sensor device includes a plurality of additional thermal sensor devices in data communication with respective energy consuming devices and configured to detect and collect respective run-time data indicative of respective energy consumption events, each additional thermal sensor device having a processor and a non-volatile memory configured to store collected energy use run-time data;
said remote computing device is configured to receive respective collected energy use data from a plurality of applications running on a plurality of local computing devices and representative of a community of users;

said remote memory of said remote computing device includes a user database having a plurality of user records, each user record including data indicative of a user's personal identification, location being monitored, and energy use data associated with said monitored location.

6. The system as in claim 4, wherein said programming causes said remote processor to populate one or more web pages configured to display said derived energy use profile and said derived reduction proposal.

7. The system as in claim 4, wherein said programming causes said remote processor to monitor said energy use profile and said proposed reduction to determine compliance or progress in attaining said proposed reduction, whereby providing encouragement to a user of the system.

8. The system as in claim 4, wherein said thermal sensor device is a thermostat that is programmable, said thermostat, comprising:
   a thermometer configured to determine a current temperature of ambient air;
   a sensor device processor in data communication with the said thermometer and configured to activate the HVAC device when said thermometer is indicative of a temperature greater than or less than a predetermined temperature and to deactivate the HVAC device when said thermometer is indicative of a temperature at a predetermined variance relative to a predetermined temperature;
   wherein said sensor device processor is configured to determine a start time at which the HVAC device is activated and a stop time at which the energy consuming device is deactivated;
   a real time clock member in data communication with said sensor device processor and configured to provide actual time parameters associated with said start time and said stop time;
   wherein said sensor device processor, in data communication with said application and said remote computing device, is operable to actuate the HVAC device according to said derived proposed reduction of said energy use profile, whereby operation of the HVAC device will start and stop in accordance with said derived proposed reduction;
   a non-volatile memory configured to store said start/stop data; and
   a low energy signal interface configured to transmit said start/stop data.

9. The system as in claim 5, wherein:
   each user record includes data indicative of an amount of energy savings associated with a respective location being monitored;
   each user record includes parameters associated with a type of energy consuming device from which energy use data is being collected by one of said thermal sensor device and said plurality of additional thermal sensor devices.

10. The system as in claim 5, wherein said programming causes said remote processor to populate one or more web pages for each of said community of users, each website configured to display said derived energy use profile and said derived reduction proposal.

11. The system as in claim 9, wherein said programming causes said remote processor to access said plurality of user records of said user database and to aggregate respective energy savings data from said user records and to correlate said aggregated energy savings to a reduction in demand for energy resources.

12. The system as in claim 11, wherein said programming causes said remote processor to access energy demand mapping sources via an online connection so as to determine demand for energy resource data.

13. The system as in claim 1, wherein:
   said application is configured to actuate an input member of the local computing device to receive personal and energy consuming device data from a user; and
   said application is configured to deliver said received user data to said remote computing device.

14. The system as in claim 1, wherein the local computing device is one of a personal computer, a mobile phone, a personal digital assistant, an electronic tablet, and an electronic device capable of receiving Bluetooth low energy signals ("BLE").

15. The system as in claim 1, wherein:
   said remote computing device includes programming that causes said remote processor to receive a query from a user, to access data in said remote memory, to generate a report, and to deliver said report to said application;
   said application is configured to actuate the output member of the local computing device to display said report.

16. The system as in claim 1, wherein said energy sensor device and said application running on the local computing device are in data communication via a personal wireless network that transmits and receives low energy signals.

17. The system as in claim 1, wherein said remote computing device is in data communication with said application running on a local computing device via a wide area network.

18. A method for detecting, monitoring, and reporting energy use in a home having a HVAC device, said system comprising:
   detecting and collecting time data associated with the HVAC device and including only time data unrelated to electrical current or voltage using thermal sensor device that is configured to detect and collect a start time and a stop time associated with an energy consumption event of the HVAC device;
   wherein said time data includes real time data associated with said time data, said real time data including a start time and an end time;
   receiving said collected time data via an application running on a local computing device in data communication with said thermal sensor device;
   receiving said collected time data on a remote computing device located remotely from and in electronic communication with said application;
   said remote computing device deriving an energy use profile based on said received collected time data and said associated real time data and delivering said derived energy use profile to said application;
   displaying said derived energy use profile via an output member of the local computing device;
   deriving a proposed reduction of said energy use profile and delivering said derived proposed reduction to said application;
   causing the HVAC device to start and stop according to the derived proposed reduction of said energy use profile;
   determining targeted advice data from recommendation data available from said remote computing device based on said collected energy use data, said real time data, and said associated weather data;
   displaying said targeted advice data by actuating an output member of the local computing device;
   wherein:
   said collected time data includes variation data of thermal step response data indicative of a variation in time from an end of a respective "on period" and a next start time relative to activation of the energy consuming device;

said method comprising determining targeted advice data from said recommendation data based on said variation data derived from said collected energy use data, said real time data, said thermal step response data, and said associated weather data.

19. The method as in claim 18, wherein:
one of said thermal sensor device and said application is configured to generate a geographical indicator associated with said collected energy use data;
said method further comprising accessing weather data associated with a respective geographical indicator and associated with respective real time data of said collected time data.

20. The method as in claim 18, further comprising:
displaying said derived energy use profile via an output member of the local computing device;
displaying said proposed reduction by actuating an output member of the local computing device.

21. The method as in claim 20, wherein:
said thermal sensor device includes a plurality of additional thermal sensor devices in data communication with respective energy consuming devices and configured to detect and collect respective time data indicative of respective energy consumption events;
receiving respective collected time data on the remote computing device from a plurality of applications running on a plurality of local computing devices and representative of a community of users;
the remote computing device includes a user database having a plurality of user records, each user record including data indicative of a user's personal identification, location being monitored, and energy use data associated with said monitored location.

22. The method as in claim 21, wherein:
each user record includes data indicative of an amount of energy savings associated with a respective location being monitored;
each user record includes parameters associated with a type of energy consuming device from which energy use data is being collected by one of said energy sensor device and said plurality of additional energy sensor devices.

23. The method as in claim 21, further comprising populating one or more web pages for each of said community of users, each website configured to display said derived energy use profile and said derived reduction proposal.

24. The method as in claim 22, further comprising:
accessing said plurality of user records of said user database and to aggregate respective energy savings data from said user records and to correlate said aggregated energy savings to a reduction in demand for energy resources;
accessing energy demand mapping sources via an online connection so as to determine demand for energy resource data.

25. The method as in claim 18, wherein said thermal sensor device includes a sensor configured to detect when the HVAC device switches on or off, a sensor device processor configured to obtain said detected start/stop data from said sensor, a sensor device non-volatile memory configured to store said obtained start/stop data, and a low energy signal interface configured to transmit said obtained start/stop data.

26. The method as in claim 25, wherein said thermal sensor device is a programmable thermostat comprising:
a thermometer configured to determine a current temperature of ambient air;
a sensor device processor in data communication with the thermometer and configured to activate the HVAC device when said thermometer is indicative of a temperature greater than or less than a predetermined temperature and to deactivate the energy consuming device when said thermometer is indicative of a temperature at a predetermined variance relative to a predetermined temperature;
wherein said sensor device processor is configured to determine a start time at which the HVAC device is activated and a stop time at which the energy consuming device is deactivated;
a real time clock member in data communication with said sensor device processor and configured to provide actual time parameters associated with said start time and said stop time;
a non-volatile memory configured to store said start/stop data; and
a low energy signal interface configured to transmit said start/stop data.

* * * * *